(12) United States Patent
Xiong

(10) Patent No.: US 9,125,259 B1
(45) Date of Patent: Sep. 1, 2015

(54) CONSTANT CURRENT DRIVE CIRCUIT FOR MULTI-CHANNEL LED LIGHTING

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 301 days.

(21) Appl. No.: 13/874,928

(22) Filed: May 1, 2013

Related U.S. Application Data

(60) Provisional application No. 61/642,001, filed on May 3, 2012.

(51) Int. Cl.
*H05B 37/00* (2006.01)
*H05B 39/00* (2006.01)
*H05B 41/14* (2006.01)
*H05B 33/08* (2006.01)

(52) U.S. Cl.
CPC .................................. *H05B 33/0809* (2013.01)

(58) Field of Classification Search
CPC ........... H05B 33/0803; H05B 33/0806; H05B 33/0809; H05B 37/029; H05B 37/00; H05B 41/14; H05B 41/36

USPC ....... 315/51, 121, 130, 195, 200 R, 201, 205, 315/206, 210–212, 219
See application file for complete search history.

(56) References Cited

U.S. PATENT DOCUMENTS 8,525,428 B2 * 9/2013 Chen et al. .................... 315/219

* cited by examiner

*Primary Examiner* — Hai L Nguyen
(74) *Attorney, Agent, or Firm* — Patterson Intellectual Property Law, P.C.; Mark J. Patterson; Gary L. Montle

(57) ABSTRACT

An LED driver circuit is provided for driving a multi-channel LED string with constant and balanced current. The driver circuit includes a half-bridge inverter and a resonant tank circuit in a power stage. An isolating (first) transformer includes a primary winding coupled between a resonant tank output and circuit ground and a plurality of secondary windings, while a balancing (second) transformer includes a plurality of balancing windings. A plurality of output stages each provide an output power to a respective load, and each of the output stages further includes one of the balancing windings of the balancing transformer and one of the secondary windings of the isolating transformer coupled in series, and a rectifier circuit coupled to an output end of the series coupled windings. In an embodiment, an impedance value of the balancing transformer is further configured to be greater than three times a maximum load impedance value.

20 Claims, 4 Drawing Sheets

CONSTANT CURRENT DRIVE CIRCUIT FOR MULTI-CHANNEL LED LIGHTING

BACKGROUND OF THE INVENTION

The present invention relates generally to light source driver circuits. More particularly, the invention relates to current source based driver circuits for LED lighting.

Light emitting diode (LED) lighting is growing in popularity due to decreasing costs and long life compared to incandescent lighting and fluorescent lighting. LED lighting can also be dimmed without impairing the useful life of the LED light source.

Isolated constant current source topologies that are commonly used in light source (e.g., LED) driver circuits include flyback converters, forward converters, LLC converters, and half-bridge isolated buck converters. Flyback converters and forward converters have low efficiency and require the use of high-voltage MOSFET devices. LLC converters have insufficient output voltage range, and the output is not self-limiting. Half-bridge isolated buck converters require hard switching of the MOSFET devices, have low efficiency, require complicated controllers, and the output is not self-limiting.

A particular CLASS-2 LED driver for multi-channel LED configurations is defined in Underwriters Laboratories specifications. The specification requires the multi-channel LED driver to be isolated and have a maximum output voltage of less than 60 volts DC at any given time. If a maximum load voltage (e.g., a light source such as an LED string) is close to 60 volts, then limiting the output voltage to 60 volts by operation of the control loop in the driver circuit is difficult because control loops inherently have over-shoot and delay.

An LED driver circuit should be capable of driving different loads that have different numbers of LEDs. Thus, the LED driver has to be capable of a wide range of output voltages while maintaining control of the output current.

A driver circuit with dimming capability, self-limited output voltage, and a wide output voltage range is thus desirable.

BRIEF SUMMARY OF THE INVENTION

In accordance with embodiments of the present invention, an LED driver circuit is provided for driving a multi-channel LED string with constant and balanced current. The driver circuit includes a half-bridge inverter and a resonant tank circuit in a power stage. An isolating (first) transformer includes a primary winding coupled between a resonant tank output and circuit ground and a plurality of secondary windings, while a balancing (second) transformer includes a plurality of balancing windings. Each of a plurality of output stages provides an output power to a respective load. Each of the output stages further include one of the balancing windings of the balancing transformer and one of the secondary windings of the isolating transformer coupled in series, and a rectifier circuit coupled to an output end of the series coupled windings.

In an embodiment, one aspect of the present invention is that an impedance value of the balancing transformer is further configured to be greater than three times a maximum load impedance value.

In another aspect according to the present invention, a current sensor is configured to sense the output current through the load for only one of the output stages. A controller is coupled to receive the sensed output current and further configured to control the switching frequency of the half-bridge inverter and define a multi-channel constant source with constant current and balanced current in each of the plurality of channels based on the sensed output current and a maximum output current value.

In another aspect according to the present invention, the half-bridge inverter includes a first switch having a high terminal, a low terminal, and a control terminal, wherein the high terminal is connected to the power rail of the DC power source, and a second switch having a high terminal, a low terminal, and a control terminal, wherein the low terminal is connected to the ground of the DC power source, and the high terminal of the second switch is connected to the low terminal of the first switch. The driver circuit further includes a gate drive transformer configured to receive a gate drive signal from the controller, the gate drive signal controlling the switching frequency of the half-bridge inverter. The gate drive transformer has a primary winding, a first secondary winding, and a second secondary winding. A gate drive capacitor is connected in series with the primary winding of the gate drive transformer across a gate drive output of the controller. A first gate drive resistor is connected in series with the first secondary winding of the gate drive transformer between the control terminal of the first switch and the output of the half-bridge inverter, and a second gate drive resistor is connected in series with the second secondary winding of the gate drive transformer between the control terminal of the second switch and the ground of the DC power circuit, wherein the polarity of the first secondary winding and the second secondary winding of the gate drive transformer are opposite such that the first switch and second switch are driven out of phase by the gate drive transformer.

In another aspect according to embodiments of the present invention, each of the output stages further include a filtering inductance coupled in series between the rectifying circuit and the load.

In one embodiment, a filtering transformer is provided with a plurality of filtering windings, the filtering inductance for each of the output stages comprising one of the filtering windings for the filtering transformer.

In another aspect according to embodiments of the present invention, the resonant tank further includes a first clamping diode having an anode connected to a junction between the resonant inductor and the resonant capacitor and a cathode connected to the power rail of the DC power source, and a second clamping diode having an anode connected to the ground of the DC power source and a cathode connected to the junction between the resonant capacitor and the resonant inductor.

In still another aspect according to embodiments of the present invention, the controller is connected to an external dimming circuit and configured to receive a dimming signal from the dimming circuit, wherein the controller is operable to control the current provided to the light source as a function of the received dimming signal by adjusting the target current as a function of the received dimming signal.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, "ballast" refers to any circuit for providing power from a power source to a light source. Additionally, "light source" refers to one or more light emitting devices such as fluorescent lamps, high intensity discharge lamps, incandescent bulbs, and solid state light-emitting elements such as LEDs, organic light emitting diodes, and plasmaloids.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Figures 1, 1A:
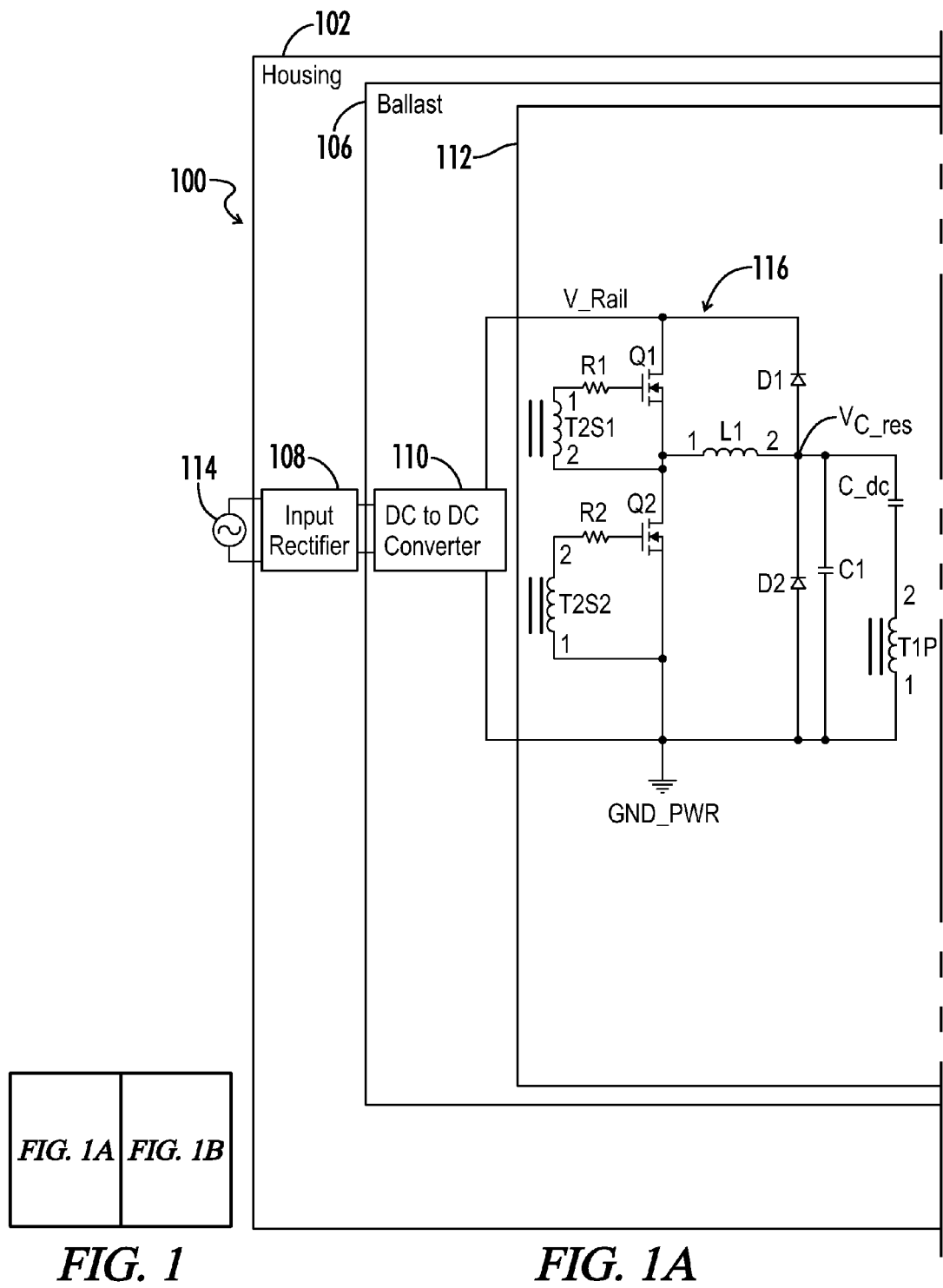
FIG. 1 (including FIGS. 1A and 1B) is a block diagram and partial schematic diagram representing a light fixture according to an embodiment of the present invention, including a light source and a ballast.
Figure 1B:
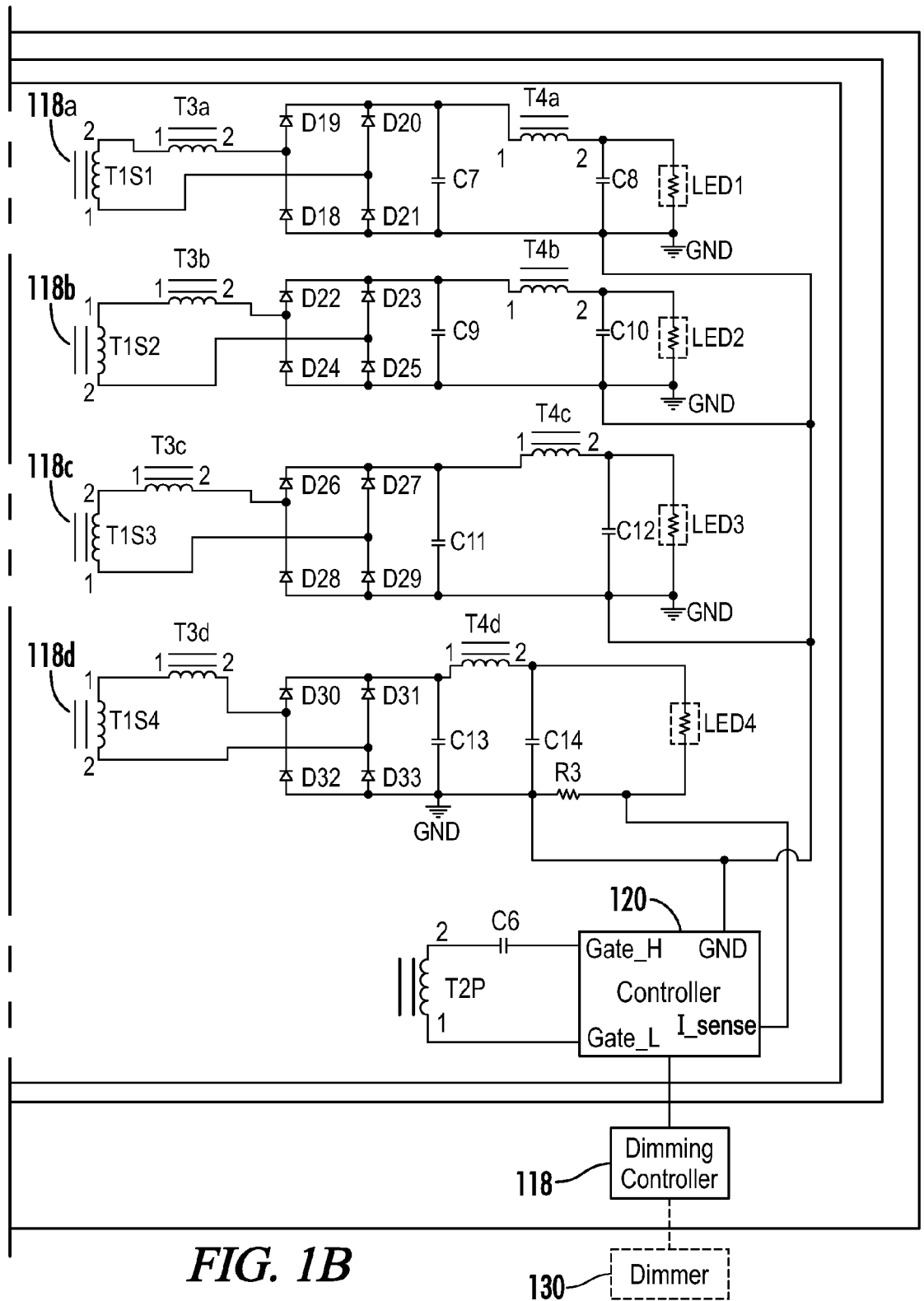

Referring to FIG. 1, in a particular embodiment of the present invention a light fixture 100 includes a housing 102 and a ballast 106 further including a driver circuit 112 with a power (input) stage 116 and a plurality of output stages 118 for driving respective light sources LEDn (wherein "n" represents an integer value as a number of respective light sources). The light fixture 100 receives power from an alternating current (AC) power source 114 and provides light from the light sources LEDn. Each light source LEDn provides light in response to receiving current. The housing 102 is connected to the ballast 106 and the light sources LEDn. In one embodiment, the housing 102 supports the ballast 106 and the light sources LEDn in a predetermined spatial relationship. In one embodiment, the light sources LEDn are a plurality of series and parallel connected light-emitting diodes. In one embodiment, the light fixture 100 also includes a dimming circuit operable to provide a dimming signal to a controller 120 of the ballast 106. The dimming signal is indicative of a target current or light intensity level for the light sources.

The ballast 106 is operable to provide current to the light sources from the AC power source 114. The ballast 106 includes an input rectifier 108 and a driver circuit 112. The input rectifier 108 is operable to connect to the AC power source 114 and provide a DC power source having a power rail V_RAIL and a ground GND_PWR at an output of the input rectifier 108. In one embodiment, the ballast 106 also includes a DC-to-DC converter 110 connected between the input rectifier 108 and the driver circuit 112. The DC-to-DC converter 110 is operable to alter a voltage of a power rail V_RAIL of a DC power source provided by the input rectifier 108. The driver circuit 112 is operable to provide current to the light sources from the DC power source provided by the input rectifier 108.

The driver circuit 112 includes a half-bridge inverter, a resonant tank circuit, an isolating transformer T1, a plurality of output stages 118, and a controller 120. The driver circuit 112 provides a self-limiting output voltage, has relatively high efficiency, is capable of dimmed operation, and has a wide output voltage operating range. The driver circuit 112 operates as a constant current source with a self-limiting output voltage. The driver circuit 112 is optionally dimmable such that the constant current can be changed. The half-bridge inverter includes a first switch Q1 (i.e., a high side switch) and a second switch Q2 (i.e., a low side switch) and has an input and an output. The input of the half-bridge inverter is operable to connect to the power rail V_RAIL and the ground PWR_GND of the DC power source and provide an AC signal at the output of the half-bridge inverter. In one embodiment, the input of the half-bridge inverter is a high side of the high side switch, and a low side of the low side switch (e.g., second switch Q2) is operable to connect to the ground of the DC power source.

The resonant tank circuit includes a resonant inductor L1, a resonant capacitor C1, a first clamping diode D1, and a second clamping diode D2. The resonant tank circuit has an input and an output. The input of the resonant tank circuit (e.g., a first terminal of a resonant inductor L1) is connected to the output of the half-bridge inverter. The resonant capacitor C1 is connected in series with the resonant inductor L1 between the output of the half-bridge inverter and the ground GND_PWR of the DC power source. The first clamping diode D1 has an anode connected to a junction formed at the connection between the resonant inductor L1 and a resonant capacitor C1. The cathode of the first clamping diode D1 is connected to the power rail V_RAIL of the DC power source. The second clamping diode D2 has an anode connected to the ground PWR_GND of the DC power source and a cathode connected to the junction between the resonant capacitor C1 and the resonant inductor L1. In one embodiment, the resonant tank circuit includes a DC blocking capacitor C_DC connected between the junction of the resonant inductor L1 and resonant capacitor C1 and the output of the resonant tank circuit. The first clamping diode D1 and the second clamping diode D2 cooperate to limit the voltage at the junction between the resonant inductor L1 and a resonant capacitor C1 to a maximum voltage equal to the voltage of the power rail V_RAIL of the DC power source and a minimum voltage equal to the ground PWR_GND of the DC power source.

An isolating transformer T1 is connected to the output of the resonant tank circuit. The isolating transformer includes a primary winding T1P and secondary windings T1Sn. The primary winding T1P is connected between the output of the resonant tank circuit and the ground PWR_GND of the DC power source.

Each of the plurality of output stages 118n include a respective one of the secondary windings T1Sn of the isolating transformer, a balancing inductance T3n, a diode bridge rectifier, and output terminals operable to connect to a respective light source LEDn. In one embodiment, the turns ratio of the isolating transformer is selected as a function of a voltage of the power rail V_RAIL of the DC power source and a predetermined output voltage limit. In one embodiment, the output voltage limit is 60 VDC.

In one embodiment, the balancing inductance for each output stage 118 is a respective balancing winding T3n for a balancing transformer. The balancing transformer is operable to balance the current for each channel, with the four secondary windings T1Sn as represented in FIG. 1 forming four channels for driving four respective loads/light sources. In each output stage, a balancing winding T3n is coupled in series with an isolation transformer secondary winding T1Sn to limit and balance the output current. In a preferable embodiment, the design of the balancing transformer is such that an impedance of the balancing transformer is greater than three times a maximum load impedance value:

$$Z\_tb > (Z\_load\_max * 3) \qquad (Eq. 1)$$

The balancing transformer in various embodiments further provides natural protection against a short circuit condition for the driver circuit. When an output is shorted, the balancing transformer limits the current passing through the short to a maximum output current I_out_max, and thereby may automatically satisfy UL class 2 current regulation requirements.

In various embodiments another coupled inductor T4n is provided as an output current filtering inductor. The various filtering windings T4a, T4b, T4c, T4d can be magnetically coupled together to achieve improved current balancing. However, in alternative embodiments the filtering windings may be independent inductors without any further magnetic coupling between them.

Each output stage as represented in FIG. 1 further includes filtering capacitors C7, C8, C9, C10, C11, C12, C13, C14 to reduce the output current ripple going through the respective loads.

The controller 120 is operable to sense current provided to the light sources from the output rectifier 116 and to adjust a switching frequency of the half-bridge inverter as a function of the sensed current to maintain the sensed current at a target current. In one embodiment, the output current is limited to:

$$I_{out\_max} = (V_{rms\_}T1S/Z\_tb) * 0.9 \qquad (Eq. 2)$$

Because current in each of the multiple channels is balanced by the balancing transformer, only one channel current needs to be sensed to control the current for each channel. In an embodiment as represented in FIG. 1, a resistor R3 is coupled in series with a light source LED4 to sense the DC output current of a respective channel 118d. A current sensing signal I_sense is fed back to controller 120 for frequency control of the main tank.

In one embodiment, the target current is determined as a function of the dimming signal provided by the dimming controller 118. The controller 120 is further operable to control the current provided to the light sources as a function of the received dimming signal by adjusting the target current as a function of the received dimming signal. In one embodiment, the controller 120 adjusts the current provided to the light sources by adjusting a switching frequency of the half-bridge inverter.

In one embodiment, the driver circuit 112 further includes a gate drive transformer. The gate drive transformer is operable to receive the gate drive signal from the controller 120 which controls the switching frequency of the half-bridge inverter. The gate drive transformer includes a primary winding T2P, a first secondary winding T2S1, and a second secondary winding T2S2. In this embodiment, the first switch Q1 and the second switch Q2 of the half-bridge inverter each have a high terminal, a low terminal, and a control terminal. The high terminal of the first switch Q1 is connected to the power rail V_RAIL of the DC power source. The low terminal of the second switch Q2 is connected to the ground PWR_GND of the DC power source. The high terminal of the second switch Q2 is connected to the low terminal of the first switch Q1. A gate drive capacitor C6 is connected in series with the primary winding T2P of the gate drive transformer across a gate drive output (i.e., gate_H and gate_L) of the controller 120. A first gate drive resistor R1 is connected in series with the first secondary winding T2S1 of the gate drive transformer between the control terminal of the first switch Q1 and the output of the half-bridge inverter. A second gate drive resistor R2 is connected in series with the second secondary winding T2S2 of the gate drive transformer between the control terminal of the second switch Q2 and the ground PWR_GND of the DC power circuit. The polarity of the first secondary winding T2S1 and the second secondary winding T2S2 of the gate drive transformer are opposites such that the first switch Q1 and the second switch Q2 are driven out of phase by the gate drive transformer.

Figure 2:
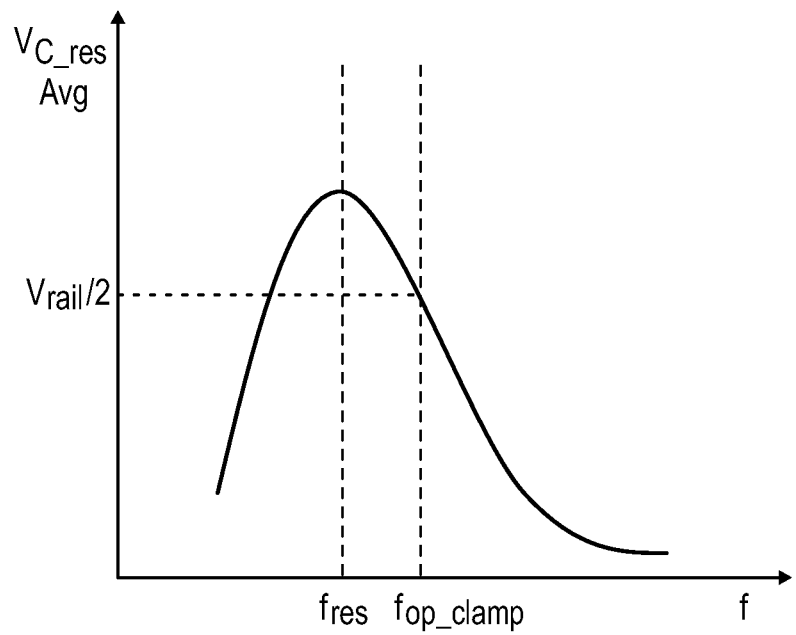
FIG. 2 is a graphical plot of average voltage of the resonant capacitor versus frequency of the half-bridge inverter for a driver circuit topology that does not include clamping diodes.

Referring to FIG. 2, a plot of average resonant capacitor voltage $V_{C\_res}$ versus frequency is shown for a driver circuit topology that does not include the first clamping diode D1 and the second clamping diode D2. Because the voltage $V_{C\_res}$ of the resonant capacitor C1 is not clamped or limited, the voltage $V_{C\_res}$ of the resonant capacitor C1 can be much greater than one-half the voltage of the power rail V_RAIL of the DC power source.

In contrast, in the driver circuit 112 which includes the first clamping diode D1 and the second clamping diode D2, the average voltage $V_{C\_res}$ of the resonant capacitor C1 is clamped at one-half the voltage of the power rail V_RAIL (i.e., V_RAIL/2 in FIG. 3), regardless of the operating (i.e., switching) frequency of the half-bridge inverter because the instantaneous voltage of the resonant capacitor is clamped at the voltage of the power rail V_RAIL. The maximum frequency at which the first clamping diode D1 and the second clamping diode D2 limit the voltage of the resonant capacitor C1 is the clamping frequency $f_{op\_clamp}$. Above the clamping frequency $f_{op\_clamp}$, the average voltage of the resonant capacitor C1 is less than V_RAIL/2.

Thus, when the operating frequency (i.e., switching frequency) of the half-bridge inverter is less than the clamping frequency $f_{op\_clamp}$, the voltage $V_{C\_res}$ of the resonant capacitor C1 is still limited to one-half the voltage of the power rail V_RAIL. Thus, when the switching frequency is at the resonant frequency $f_{res}$ of the resonant tank, the average voltage $V_{C\_res}$ across the resonant capacitor C1 will be limited to one half the voltage of the power rail V_RAIL, but reducing the frequency below the clamping frequency $f_{op\_clamp}$ (e.g., to the resonant frequency $f_{res}$ of the resonant tank circuit) can provide more current to the primary winding T1S1 of the isolating transformer. The driver circuit 112 can thereby provide additional current to the light sources without increasing the output voltage of the driver circuit 112 by decreasing the operating frequency of the half-bridge inverter.

Figure 3:
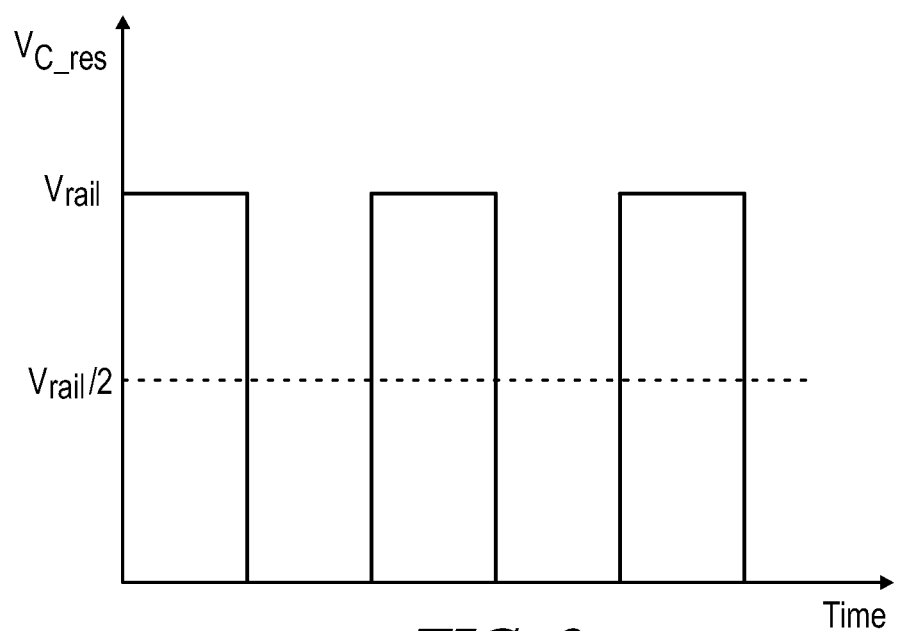
FIG. 3 is a plot of voltage of the resonant capacitor versus time for a switching frequency of the half-bridge inverter that is less than the resonant frequency of the resonant tank circuit.
Figure 4:
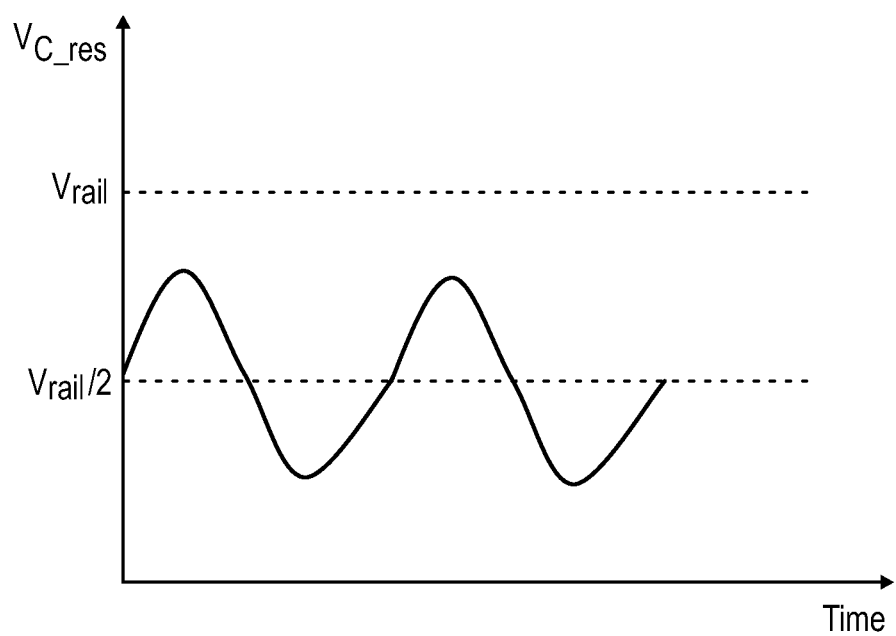
FIG. 4 is a plot of voltage of the resonant capacitor versus time for a switching frequency of the half-bridge inverter that is greater than the resonant frequency of the resonant tank circuit.

Referring to FIG. 3, the voltage waveform for the resonant capacitor C1 is shown for an operating frequency that is less than the resonant frequency $f_{res}$ of the resonant tank circuit. Referring to FIG. 4, the voltage waveform for the resonant capacitor C1 is shown for an operating frequency that is greater than the resonant frequency $f_{res}$ of the resonant tank circuit.

Because the maximum voltage across the resonant capacitor C1 is clamped, the maximum peak voltage across the isolating transformer primary winding T1S1 is also clamped. Thus, if the turns ratio N of the isolating transformer is selected such that $$N = \frac{V\_RAIL}{2} * \frac{1}{60},$$

then the secondary winding voltage of the isolating transformer will never exceed 60 Volts (i.e., the UL Class-2 limit). The half-bridge inverter and the resonant tank circuit is thus a voltage source with a self-clamped output voltage.

Further, because the voltage $V_{C\_res}$ across the resonant capacitor C1 is limited to V_RAIL/2, the half-bridge inverter that drives the resonant tank circuit will always operate in a soft-switching condition. This reduces the switching losses and increases the efficiency of the driver circuit 112.

Referring again to FIG. 2, the voltage $V_{C\_res}$ across the resonant capacitor C1 can vary between V_RAIL/2 and 0 volts. The driver circuit 112 can thus drive any light source L2 (e.g., any LED configuration) from the predetermined maximum output voltage (e.g., 60 volts) to the minimum voltage (i.e., 0 volts).

In one embodiment, the driver circuit 112 includes a series resonant inverter that has a self-limited output voltage. The series resonant inverter exhibits half-bridge soft-switching under all operating conditions. The driver circuit 112 operates as a constant current source that has a self-limited output voltage. The driver circuit 112 operates as a constant current source that has a wide output voltage operating range. The driver circuit 112 can be controlled by an external reference signal (i.e., a dimming signal from a dimmer 130 interfacing with the dimming controller 118) to provide a dimming function.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, circuits, and controllers described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as hard coding, computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

What is claimed is:

1. A driver circuit operable to provide current to a plurality of light sources from a direct current (DC) power source having a power rail and a ground, the driver circuit comprising:

a half-bridge inverter having an input and an output, wherein the input is configured to connect to the power rail and the ground of the DC power source and provide an alternating current (AC) signal at the output;

a resonant tank circuit comprising a resonant inductor and a resonant capacitor coupled in series between the output of the half-bridge inverter and the ground of the DC power source;

an isolating transformer comprising a primary winding coupled between an output of the resonant tank circuit and the ground of the DC power source, and a plurality of secondary windings;

a balancing transformer comprising a plurality of balancing windings; and a plurality of output stages configured to provide an output power to a respective load, each of the output stages further comprising
one of the balancing windings of the balancing transformer and one of the secondary windings of the isolating transformer coupled in series, and
a rectifier circuit coupled to an output end of the series coupled windings.

2. The driver circuit of claim 1, wherein an impedance value of the balancing transformer is configured to be greater than three times a maximum load impedance value.

3. The driver circuit of claim 1, further comprising
a current sensor configured to sense the output current through the load for one of the output stages; and
a controller coupled to receive the sensed output current and configured to control the switching frequency of the half-bridge inverter based on the sensed output current and a maximum output current value.

4. The driver circuit of claim 3, wherein the half-bridge inverter comprises
a first switch having a high terminal, a low terminal, and a control terminal, wherein the high terminal is connected to the power rail of the DC power source, and
a second switch having a high terminal, a low terminal, and a control terminal, wherein the low terminal is connected to the ground of the DC power source, and the high terminal of the second switch is connected to the low terminal of the first switch; and
the driver circuit further comprises
a gate drive transformer configured to receive a gate drive signal from the controller, the gate drive signal controlling the switching frequency of the half-bridge inverter, the gate drive transformer comprising a primary winding, a first secondary winding, and a second secondary winding,
a gate drive capacitor connected in series with the primary winding of the gate drive transformer across a gate drive output of the controller,
a first gate drive resistor connected in series with the first secondary winding of the gate drive transformer between the control terminal of the first switch and the output of the half-bridge inverter,
a second gate drive resistor connected in series with the second secondary winding of the gate drive transformer between the control terminal of the second switch and the ground of the DC power circuit, and
wherein the polarity of the first secondary winding and the second secondary winding of the gate drive transformer are opposite such that the first switch and second switch are driven out of phase by the gate drive transformer.

5. The driver circuit of claim 1, each of the output stages further comprising a filtering inductance coupled in series between the rectifying circuit and the load.

6. The driver circuit of claim 5, further comprising a filtering transformer having a plurality of filtering windings, the filtering inductance for each of the output stages comprising one of the filtering windings for the filtering transformer.

7. The driver circuit of claim 1, the resonant tank further comprising:
a first clamping diode having an anode connected to a junction between the resonant inductor and the resonant capacitor and a cathode connected to the power rail of the DC power source, and
a second clamping diode having an anode connected to the ground of the DC power source and a cathode connected to the junction between the resonant capacitor and the resonant inductor.

8. The driver circuit of claim 1, wherein:
the controller is connected to a dimming circuit and configured to receive a dimming signal from the dimming circuit; and
wherein the controller is operable to control the current provided to the light source as a function of the received dimming signal by adjusting the target current as a function of the received dimming signal.

9. A ballast operable to provide current to a plurality of light sources from an alternating current (AC) power source, the ballast comprising:
an input rectifier configured to connect to the AC power source and provide a direct current (DC) power source having a power rail and a ground at an output of the input rectifier; and
a driver circuit operable to provide current to the light sources from the DC power source, the driver circuit comprising
a half-bridge inverter having an input and an output, wherein the input is configured to connect to the power rail and the ground of the DC power source and provide an alternating current (AC) signal at the output;
a resonant tank circuit comprising a resonant inductor and a resonant capacitor coupled in series between the output of the half-bridge inverter and the ground of the DC power source;
an isolating transformer comprising a primary winding coupled between an output of the resonant tank circuit and the ground of the DC power source, and a plurality of secondary windings;
a balancing transformer comprising a plurality of balancing windings; and
a plurality of output stages configured to provide an output power to a respective light source, each of the output stages further comprising
one of the balancing windings of the balancing transformer and one of the secondary windings of the isolating transformer coupled in series, and
a rectifier circuit coupled to an output end of the series coupled windings.

10. The ballast of claim 9, wherein an impedance value of the balancing transformer is configured to be greater than three times a maximum load impedance value.

11. The ballast of claim 9, further comprising
a current sensor configured to sense the output current through the load for one of the output stages; and
a controller coupled to receive the sensed output current and configured to control the switching frequency of the half-bridge inverter based on the sensed output current and a maximum output current value.

12. The ballast of claim 11, wherein the half-bridge inverter comprises a first switch having a high terminal, a low terminal, and a control terminal, wherein the high terminal is connected to the power rail of the DC power source, and a second switch having a high terminal, a low terminal, and a control terminal, wherein the low terminal is connected to the ground of the DC power source, and the high terminal of the second switch is connected to the low terminal of the first switch; and the driver circuit further comprises a gate drive transformer configured to receive a gate drive signal from the controller, the gate drive signal controlling the switching frequency of the half-bridge inverter, the gate drive transformer comprising a primary winding, a first secondary winding, and a second secondary winding, a gate drive capacitor connected in series with the primary winding of the gate drive transformer across a gate drive output of the controller, a first gate drive resistor connected in series with the first secondary winding of the gate drive transformer between the control terminal of the first switch and the output of the half-bridge inverter, a second gate drive resistor connected in series with the second secondary winding of the gate drive transformer between the control terminal of the second switch and the ground of the DC power circuit, and wherein the polarity of the first secondary winding and the second secondary winding of the gate drive transformer are opposite such that the first switch and second switch are driven out of phase by the gate drive transformer.

13. The ballast of claim 9, each of the output stages further comprising a filtering inductance coupled in series between the rectifying circuit and the load.

14. The ballast of claim 13, further comprising a filtering transformer having a plurality of filtering windings, the filtering inductance for each of the output stages comprising one of the filtering windings for the filtering transformer.

15. A light fixture comprising:
a plurality of light sources operable to provide light in response to receiving current;
a ballast operable to provide current to the light sources from an AC power source, the ballast comprising
an input rectifier operable to connect to the AC power source and provide a direct current (DC) power source having a power rail and a ground at an output of the input rectifier, and
a driver circuit operable to provide current to the light sources from the DC power source, the driver circuit comprising
a half-bridge inverter having an input and an output, wherein the input is configured to connect to the power rail and the ground of the DC power source and provide an alternating current (AC) signal at the output;
a resonant tank circuit comprising a resonant inductor and a resonant capacitor coupled in series between the output of the half-bridge inverter and the ground of the DC power source;
an isolating transformer comprising a primary winding coupled between an output of the resonant tank circuit and the ground of the DC power source, and a plurality of secondary windings;
a balancing transformer comprising a plurality of balancing windings; and a plurality of output stages configured to provide an output power to a respective load, each of the output stages further comprising
one of the balancing windings of the balancing transformer and one of the secondary windings of the isolating transformer coupled in series, and
a rectifier circuit coupled to an output end of the series coupled windings;
a controller operable to sense current provided to the light source from the output rectifier and adjust a switching frequency of the half-bridge inverter as a function of the sensed current to maintain the sensed current at a target current; and
a housing connected to the ballast and the light source.

16. The light fixture of claim 15, wherein an impedance value of the balancing transformer is configured to be greater than three times a maximum load impedance value.

17. The light fixture of claim 15, further comprising
a current sensor configured to sense the output current through the load for one of the output stages; and
a controller coupled to receive the sensed output current and configured to control the switching frequency of the half-bridge inverter based on the sensed output current and a maximum output current value.

18. The light fixture of claim 17, wherein the half-bridge inverter comprises
a first switch having a high terminal, a low terminal, and a control terminal, wherein the high terminal is connected to the power rail of the DC power source, and
a second switch having a high terminal, a low terminal, and a control terminal, wherein the low terminal is connected to the ground of the DC power source, and the high terminal of the second switch is connected to the low terminal of the first switch; and
the driver circuit further comprises
a gate drive transformer configured to receive a gate drive signal from the controller, the gate drive signal controlling the switching frequency of the half-bridge inverter, the gate drive transformer comprising a primary winding, a first secondary winding, and a second secondary winding,
a gate drive capacitor connected in series with the primary winding of the gate drive transformer across a gate drive output of the controller,
a first gate drive resistor connected in series with the first secondary winding of the gate drive transformer between the control terminal of the first switch and the output of the half-bridge inverter,
a second gate drive resistor connected in series with the second secondary winding of the gate drive transformer between the control terminal of the second switch and the ground of the DC power circuit, and
wherein the polarity of the first secondary winding and the second secondary winding of the gate drive transformer are opposite such that the first switch and second switch are driven out of phase by the gate drive transformer.

19. The light fixture of claim 15, each of the output stages further comprising a filtering inductance coupled in series between the rectifying circuit and the load.

20. The light fixture of claim 19, further comprising a filtering transformer having a plurality of filtering windings, the filtering inductance for each of the output stages comprising one of the filtering windings for the filtering transformer.

* * * * *